(No Model.)
L. N. PETITPAIN.
BICYCLE PUMP.
No. 558,837.  Patented Apr. 21, 1896.
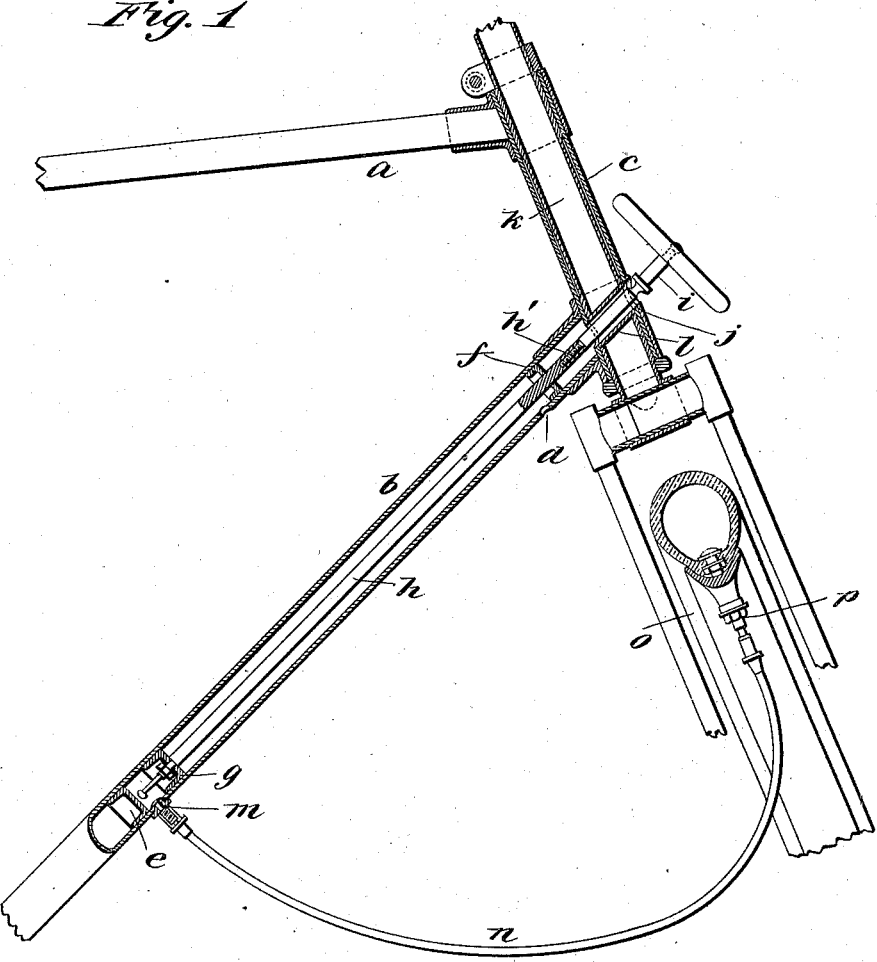
Fig. 2
Fig. 3
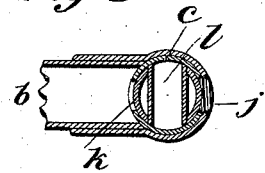
Witnesses
J. T. Coleman
Nellie Callahan
Inventor
Louis N. Petitpain
by Wm. F. Finckel
Atty.

UNITED STATES PATENT OFFICE.

LOUIS N. PETITPAIN, OF PARIS, FRANCE.

BICYCLE-PUMP.

SPECIFICATION forming part of Letters Patent No. 558,837, dated April 21, 1896.

Application filed November 14, 1895. Serial No. 568,924. (No model.)

*To all whom it may concern:*

Be it known that I, LOUIS N. PETITPAIN, a citizen of the United States of America, residing at Paris, France, have invented a certain new and useful Improvement in Bicycle-Pumps, of which the following is a full, clear, and exact description.

The object of this invention is to provide a permanent air-pump in bicycle-frames for use in inflating the pneumatic tires of the wheels.

Having reference more especially to that class of bicycle-frames commonly known as "diamond frames," my invention consists in utilizing that tubular member of the frame which extends from the front fork downwardly and rearwardly to the hanger, in which is supported the pedal-shaft for the pump-cylinder, and arranging therein the piston and piston-rod, the piston-rod normally being concealed within said tubular member and the socket member of the frame which receives the handle-bar being perforated in line with the said tubular member, and the handle-bar itself also being perforated and adapted to have its perforation aline with the perforation in the socket, so that when thus alined a wrench or key or piston-operating handle may be inserted and connected with the piston-rod, so as to permit of the reciprocation of the piston. The tubular member which forms the cylinder of the pump is provided with a nipple to which a hose may be attached, and such hose may be connected with the air-valves of the wheels for the purpose of inflating the tires.

In the accompanying drawings, illustrating my invention, in the several figures of which like parts are similarly designated, Figure 1 is a sectional elevation of sufficient of a bicycle to illustrate my invention. Fig. 2 is a detail, and Fig. 3 is a cross-section, showing the alined openings in the handle-bar and socket.

The upper member $a$ of the frame and the lower member $b$ thereof may be connected, as usual, with the handle-bar-socket member $c$. The member $b$ is provided with an air-inlet $d$. A stopper $e$ is arranged within the member $b$, and a stopper and guide-piece $f$ is also provided in said member. Thus altered, the said member $b$ is utilized as a cylinder to receive the piston $g$, which is provided with a piston-rod $h$, which extends through an opening in the stopper $f$ and is supported and guided therein. The end $h'$ of the piston-rod is screw-threaded thereby to receive a wrench, key, or other pump-operating handle $i$, which is attachable and detachable at pleasure.

In order to provide for the connection of the device $i$ with the piston-rod, I provide a perforation $j$ in the member $c$, made therein at an angle coincident with the angle of inclination of the member $b$ and in line with the piston-rod. The handle-bar $k$, which may be otherwise of usual construction, is also provided with the transverse perforation or tube $l$, which, when the handle-bar is turned at right angles to the position of use, will come into alinement with the perforation $j$, and thus provide a continuous opening for the insertion of the device $i$ and its connection with the piston-rod, whereby the piston may be operated and thereby constitute, with the member $b$, an air-pump.

$m$ is a nipple inserted in the member $b$ in advance of the stopper $e$, and $n$ is a hose or flexible tube connected with the nipple and adapted to be connected with the air-valves of the wheels, $o$ representing a portion of the front wheel, with the tube $n$ connected with the air-valve $p$.

When the pump has been used, the piston is forced down to the end of its downstroke, and then the piston-rod-operating device $i$ is unscrewed from the rod and removed, and then the handle-bar is turned into position for use, whereby its perforation is turned at right angles to the perforation in the socket, as indicated in Fig. 3, thereby to admit of its solid portion closing the opening in the socket against the entrance of dust. As a further protection against the entrance of dust the external opening in the socket may be closed by any suitable stopper or closing device—as, for example, a screw $r$, Fig. 2.

It will be observed that in my machine, as in some others, no portion of the machine has to be dismembered or detached in order to operate the pump, and I esteem that feature to be an important one in that class of bicycles wherein the tubular frame is utilized as a pump.

What I claim is—

1. In a bicycle, a tubular frame comprising a handle-bar socket and a tubular-frame member connected with the socket, such tubular-frame member subserving the purpose of an air-pump cylinder, a piston and piston-rod therein, an opening in the socket in alinement with the said member and an opening in the handle-bar adapted to be brought into alinement with the opening in the socket, to admit of the insertion and removal of a piston-rod-operating device, and to close said opening when the piston-rod-operating device is removed, substantially as described.

2. In a bicycle having a tubular frame, one member of which is utilized as an air-pump cylinder, and to this end is provided with a piston-rod and a suitable air-inlet and an air-outlet, the handle-bar socket provided with an opening alined with the piston-rod, and the handle-bar provided with an opening adapted to be brought into alinement with the opening in the socket, substantially as described.

3. In a bicycle having a tubular frame, one member of which is utilized as an air-pump, the handle-bar socket having an opening in alinement with the piston-rod of the pump, and the handle-bar also having an opening adapted to be brought into alinement with the opening in the socket, combined with a removable pump-operating handle, key or wrench, adapted to be passed through the aforesaid openings when in alinement and to be engaged with the piston-rod at pleasure and to be removed therefrom, substantially as described.

In testimony whereof I have hereunto set my hand this 8th day of November, A. D. 1895.

L. N. PETITPAIN.

Witnesses:
ELMER P. MORRIS,
J. A. HANNA.